US006448326B1

(12) United States Patent
Mayer et al.

(10) Patent No.: US 6,448,326 B1
(45) Date of Patent: *Sep. 10, 2002

(54) MIXER SYSTEM FOR THE PREPARATION OF WATER-THINNABLE COATING COMPOSITIONS

(75) Inventors: Bernd Mayer, Münster (DE); Susanne Piontek, Münster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/650,312

(22) Filed: Aug. 29, 2000

Related U.S. Application Data

(63) Continuation of application No. 08/122,592, filed as application No. PCT/EP92/00351 on Feb. 19, 1992, now abandoned.

(30) Foreign Application Priority Data

Mar. 3, 1991 (DE) .......................................... 41 10 520

(51) Int. Cl.[7] .............................................. C08L 75/00
(52) U.S. Cl. ....................... 524/507; 524/502; 524/522; 524/523; 524/533; 524/558
(58) Field of Search ................................. 524/507, 502, 524/522, 523, 533, 558

(56) References Cited

U.S. PATENT DOCUMENTS

| | | | |
|---|---|---|---|
| 3,290,350 A | 12/1966 | Hoover ........................ 260/453 |
| 3,959,201 A | 5/1976 | Chang .................... 260/29.4 R |
| 4,046,729 A | 9/1977 | Sciven et al. ......... 260/29.2 TN |
| 4,130,577 A | 12/1978 | Nagato et al. ............... 260/453 |
| 4,322,325 A | 3/1982 | Esser et al. .................. 523/457 |
| 4,410,657 A | 10/1983 | Loch ........................... 525/548 |
| 4,439,616 A | 3/1984 | Singh et al. ................... 560/25 |
| 4,489,135 A | 12/1984 | Drexler et al. ............ 428/423.1 |
| 4,558,090 A | 12/1985 | Drexler et al. ............... 524/591 |
| 4,594,374 A | 6/1986 | Stahl et al. ................... 523/501 |
| 4,719,132 A | 1/1988 | Porter, Jr. .................... 427/409 |
| 4,730,020 A | 3/1988 | Wilfinger et al. ............. 524/555 |
| 4,731,290 A | 3/1988 | Chang ......................... 428/335 |
| 4,766,185 A | 8/1988 | Ryntz et al. .................. 525/479 |
| 4,851,460 A | 7/1989 | Stranghöner et al. ......... 523/407 |
| 4,880,889 A | 11/1989 | Jung et al. .................... 526/323 |
| 4,914,148 A | 4/1990 | Hille et al. .................... 524/507 |
| 4,920,199 A | 4/1990 | Jarzombek et al. .......... 528/272 |
| 5,028,639 A | 7/1991 | Treutlein et al. .............. 523/200 |
| 5,093,408 A | 3/1992 | Jung et al. .................... 524/512 |
| 5,168,105 A | 12/1992 | Anderson, Jr. et al. ...... 524/441 |
| 5,204,401 A | 4/1993 | Anderson, Jr. et al. ...... 524/441 |
| 5,210,154 A | 5/1993 | Weidemer-ier et al. ...... 525/438 |
| 5,260,376 A | 11/1993 | Nakahate et al. ............ 525/101 |
| 5,275,847 A | 1/1994 | Schwarte et al. ......... 427/407.1 |
| 5,322,897 A | 6/1994 | Jung et al. .................... 525/123 |
| 5,370,910 A | 12/1994 | Hille et al. ................ 427/407.1 |
| 5,512,322 A | 4/1996 | Hille et al. ................ 427/407.1 |
| 5,589,228 A | 12/1996 | Wegner et al. ............ 427/407.1 |
| 5,635,564 A | 6/1997 | Wieditz et al. ............... 525/194 |
| 5,686,531 A | 11/1997 | Engelke et al. ............... 525/111 |
| 5,691,419 A | 11/1997 | Engelke et al. ............... 525/208 |
| 5,840,799 A | 11/1998 | Mayer et al. ................. 524/507 |

FOREIGN PATENT DOCUMENTS

| | | | |
|---|---|---|---|
| CA | 1340584 | 6/1988 | ......... C09D/157/10 |
| CA | 2 004 987 | 8/1989 | |
| CA | 2 107 351 | 3/1991 | ............ C09D/7/14 |
| DE | 26 24 442 A1 | 6/1976 | ........... C08L/75/04 |
| DE | 29 24 632 A1 | 6/1979 | ............ C09D/3/81 |
| DE | 29 26 584 A1 | 6/1979 | ............ C09D/3/64 |
| DE | 32 10 051 A1 | 3/1982 | ............ C09D/3/72 |
| DE | 33 21 180 A1 | 6/1983 | ............ C09D/3/66 |
| DE | 34 12 534 A1 | 4/1984 | ............ C09D/3/81 |
| DE | 36 36 183 A1 | 10/1985 | ............ C09D/5/38 |
| DE | 35 45 618 A1 | 12/1985 | ............ C09D/3/72 |
| DE | 36 09 519 A1 | 3/1986 | ............ C09D/3/72 |
| DE | 37 31 652 A1 | 9/1987 | ............ C09D/3/80 |
| DE | 37 39 332 A1 | 11/1987 | ............ B05D/7/24 |
| DE | 38 13 866 A1 | 4/1988 | ............ C09D/3/72 |
| DE | 38 23 005 A1 | 7/1988 | ......... C08F/212/00 |
| DE | 36 28 124 A1 | 8/1988 | ........... C09D/3/727 |
| DE | 38 32 826 A1 | 9/1988 | ......... C08F/220/10 |
| DE | 38 41 540 A1 | 12/1988 | ............. C08F/2/24 |
| DE | 38 41 541 A1 | 12/1988 | ............. C08F/2/22 |

(List continued on next page.)

OTHER PUBLICATIONS

English Translation of Patent No. FR 1 178 404, Jamieson, "Process for the Manufacture of a Paint and Products so Obtained" Mar. 30, 1954, pp. 1–16.
English Abstract for DE 33 21 180 A1.
Brunneman et al, "Mixer System for the Production of Solvent–Containing Coating Composition" Ser. No. 09/131, 801, filed Aug. 10, 1998.
English Abstract for DE 37 39 332 A1.
English Abstract for DE 29 24 632 A1.
English Abstract for DE 37 31 652 A1.
English Abstract for DE 36 09 519 A1.

*Primary Examiner*—Edward J. Cain

(57) ABSTRACT

The present invention relates to a mixer system for the preparation of water-thinnable coating compositions with accurately defined colors, produced from various base colorants, characterized in that the mixer system comprises A) various base colorants A which contain less than 5% by weight of water, at least one colored and/or special effect pigment, an organic solvent, at least one water-thinnable or water-dispersible binder and, optionally, auxiliary substances and additives, and B) at least one water-containing, pigment-free component B.

In addition, the present invention relates to a process for the production of coating compositions using this mixer system and to the use of the mixer system for the production of waterborne paints for coating automobile bodies and/or plastic components, especially for automobile refinishing.

24 Claims, No Drawings

FOREIGN PATENT DOCUMENTS

| | | | | |
|---|---|---|---|---|
| DE | 39 15 459 C2 | 5/1989 | .......... | C09D/175/04 |
| DE | 40 05 961 A1 | 2/1990 | ............ | B05D/7/16 |
| DE | 4 1 19 857 A1 | 6/1991 | ............ | C09D/133/14 |
| EP | 0 038 127 A1 | 3/1981 | ............ | B05D/7/26 |
| EP | 0 052 224 A3 | 10/1981 | ............ | C09D/17/00 |
| EP | 0 052 224 A2 | 10/1981 | ............ | C09D/17/00 |
| EP | 0 089 497 A2 | 2/1983 | ............ | C09D/3/72 |
| EP | 0 101 832 A1 | 7/1983 | ........ | C07C/125/073 |
| EP | 0 121 308 A2 | 2/1984 | ............ | C09D/7/14 |
| EP | 0 121 308 A3 | 2/1984 | ............ | C09D/7/14 |
| EP | 0 158 099 A2 | 3/1985 | ............ | C09D/5/38 |
| EP | 0 195 931 A1 | 2/1986 | ............ | C09D/3/80 |
| EP | 0 320 552 A1 | 12/1987 | ............ | B05D/7/16 |
| EP | 0 297 576 A1 | 6/1988 | ............ | C09D/3/72 |
| EP | 0 311 209 A1 | 10/1988 | ............ | C09D/7/14 |
| EP | 0 121 308 B1 | 5/1989 | ............ | C09D/7/14 |
| EP | 0 355 433 A2 | 7/1989 | ............ | C08G/18/08 |
| EP | 0 368 499 A3 | 10/1989 | .......... | C09D/167/00 |
| EP | 0 399 427 A1 | 5/1990 | ............ | C09D/5/38 |
| EP | 0 468 293 A1 | 7/1991 | ............ | C09D/5/38 |
| EP | 0 471 972 A2 | 7/1991 | ............ | C09D/5/38 |
| EP | 0 752 455 A1 | 1/1997 | ............ | C09D/7/14 |
| EP | 0 578 645 B1 | 4/1997 | ............ | C09D/7/14 |
| EP | 0 752 455 B1 | 12/1999 | ............ | C09D/7/14 |
| FR | 1 178 404 | 3/1954 | | |

MIXER SYSTEM FOR THE PREPARATION OF WATER-THINNABLE COATING COMPOSITIONS

This is a continuation of prior application Ser. No. 08/122,592 filed on Sep. 29, 1993 now abandoned which is a 371 of PCT/EP92/00351 filed Feb. 19, 1992.

The present invention relates to a mixer system for the preparation of water-thinnable coating compositions with accurately defined colors, produced from various base colorants.

In addition, the present invention relates to a process for the preparation of these coating compositions with accurately defined colors, in which various base colorants are stored separately and are added to the coating composition and mixed to the desired color only a short time prior to application.

Furthermore, the present invention also relates to the use of the mixer system for the preparation of waterborne paints for coating automobile bodies and/or plastic components and for the preparation of aqueous coating compositions for refinishing.

Traditional methods for repairing damaged areas of a one-coat or multicoat finish comprise careful cleaning and rubbing, possibly puttying and filling of the damaged area. Subsequently the damaged area, after a further treatment if appropriate, is sprayed with special effect paints, such as metallic basecoats, or with solid-color paints in such a way that the paint hides the damaged area and runs into the adjacent zones. After the coating produced in this way has dried, the coating and the adjacent parts are sprayed with a clearcoat and after a flash-off period which may or may not be necessary, the clearcoat is dried together with the previously applied coats preferably at temperatures between 50 and 100° C. The paints used as special effect paints and/or as solid-color paints applied in a two-coat process for repairing damaged areas are usually low-solid paints which contain, besides binders, colored and other special effect pigments and a high proportion of organic solvent mixtures.

These paints are either supplied by the paint manufacturer in the desired color or the color is produced prior to application by a mixer system consisting of a plurality of base colorants. This preparation by a mixer system has the advantage that it is not necessary for every color to be produced individually and stored and that in this way production, distribution and storage costs can be reduced. In both cases it is necessary for the supplied paints to have an adequate shelf life (at least 12 months). Furthermore, for a mixer system the color accuracy of the base colorants is very important.

While water-thinnable basecoats have been increasingly used in the production line finishing sector, conventional, i.e. solvent-borne, basecoats are still used in the automotive refinishing sector. These low-solid basecoats used hitherto for refinishing have a composition distinctly different from that of the water-thinnable basecoats used so far in production line finishing. Thus, for example, the rheology of conventional systems is largely controlled by the rate of evaporation of the organic solvents (increase of solids between the application equipment and the object to be painted), while the rheology of aqueous systems is controlled by external thickeners or by appropriate modifications to the binder. For the transition from conventional to water-thinnable systems a straightforward replacement of the binders used by water-thinnable binders is thus insufficient.

Likewise the use in the refinishing sector of the water-thinnable systems employed in the production line finishing sector is at present impossible because of the different demands made on the systems in the two sectors. That is to say, the water-thinnable metallic basecoats used in production line finishing (automotive factory finishing) do not have a shelf life that is adequate for the refinishing sector, since these water-thinnable paints suffer problems of stability linked to gas evolution (hydrogen formation by the reaction of water with the aluminum bronze) and/or of special effect stability. Both problems impair permanently the color or brightness of the resultant coatings. For this reason these systems have not found use in refinishing.

However, not only water-thinnable paints containing special effect pigments have problems associated with shelf life. Colored pigments, too, can be attacked by prolonged action of water, for example in an alkaline medium. In order that the choice of commercially available pigments is not unduly constrained, a need also exists for the formulation of storage-stable base colorants using these colored pigments.

For reasons of economy and in an effort to improve work safety (fire protection) and reduce environmental stress due to the drying of paint films, the refinishing sector has also endeavored to reduce as much as possible the organic solvents content in coating compositions. However, the poor shelf life of the known water-thinnable basecoats has hitherto prevented the creation of a mixer system as described above from such water-thinnable basecoats.

A process for the production of a multicoat coating in which first an aqueous coating composition, preferably containing metallic pigments, is applied to a filled substrate and dried prior to applying a conventional waterborne basecoat followed by a clearcoat, is known from EP-A-320, 552. Application of the aqueous coating composition prior to the basecoat/clearcoat coating is said to enhance the metallic effect, especially brightness.

This process described in EP-A-320,552 is suitable mainly for the production of a factory finish, but the description also refers to the possibility of using this process in the refinishing sector.

The aqueous compositions employed in the process of EP-A-320,552 are produced by the incorporation of an aluminum pigment paste into aqueous mixer paints. The aluminum paste used here is a paste-like mix of aluminum bronze in organic solvents and an emulsifier. However, this aluminum paste separates out after only a few hours and thus forms a deposit. This in turn normally causes color variations. This separated-out paste can only be stirred up to a limited extent using suitable stirring equipment. Furthermore, finishers usually do not have such stirring equipment at their disposal. Aluminum pastes of this type are therefore unsuitable for the creation of mixer systems for refinishing.

The aqueous coating compositions obtained after incorporation of the aluminum paste into the aqueous mixer paints also have an inadequate shelf life, which does not meet the requirements of the finishers.

Furthermore, aqueous coating compositions for the preparation of a multicoat coating in the production line finishing sector are known from EP-A-195,931 and EP-A-297,576. The preparation of the aqueous coatings is effected by incorporating a pigment paste into the aqueous binder dispersion. The pigment paste is produced by grinding of the appropriate pigments with as low amounts of a grinding resin as possible with or without organic solvents and with or without water. However, the creation of a mixer system for the refinishing sector and the measures necessary for this purpose, such as separate storage of the individual components, are not described in EP-A-195,931 and EP-A-

297,576. The pigmented aqueous coatings themselves are unsuitable for the refinishing sector on account of an inadequate shelf life.

Aqueous coating compositions for the production of a multicoat coating in the production line finishing sector are also known from EP-B-38,127. The preparation of the aqueous coating compositions is again carried out by incorporating a pigment paste in the aqueous binder dispersion. The pigment paste is prepared by grinding of the pigments with a melamine resin and organic solvents. However, the creation of a mixer system for the refinishing sector and the measures necessary for this purpose are again not described. These pigmented aqueous coating compositions of EP-B-38,127 are again unsuitable for the refinishing sector on account of an inadequate shelf life.

Water-thinnable coating compositions with an improved shelf life, especially those containing metallic pigments, are described in EP-A-368,499. The satisfactory shelf life is achieved by first preparing an anhydrous binder solution from 25 to 95% by weight of a polyether polyol or polyester polyol, 2.5 to 50% by weight of an amino resin and 0 to 50% by weight of an organic solvent into which the pigments are incorporated. The viscosity of this binder solution is adjusted with water to the desired value shortly before application. EP-A-368,499 does not describe the use of the anhydrous binder solutions in a mixer system. Furthermore, the use of the coating compositions of EP-A-368,499 under refinishing conditions is not possible, since the high proportion of polyethers/polyesters does not produce films having an adequate water resistance. Moreover, the metallic effect attained is inadequate by far both for automotive factory finishing and refinishing.

Finally, Hauska and Racz report in their paper in Farbe und Lack, Vol. 93, No. 2, 1987, pages 103 to 105, that the shelf life of aqueous colorant dispersions can be improved, inter alia, by using for the preparation of the aqueous colorant dispersions aluminum pastes which contain, in addition to aluminum pigment, a binder which is miscible with the aluminum pigment and is water-thinnable prior to use. However, the binders put forward in this paper for this preparation of the aluminum paste are unsuitable for use in aqueous coating compositions for the automotive refinishing sector. Correspondingly, the paper also states that this method has no industrial significance. Moreover, this paper does not describe the creation of a mixer system and the measures necessary f or this purpose.

Accordingly, the object of the present invention is to make available a mixer system which allows the preparation of water-thinnable coating compositions with accurately defined colors, produced from various base colorants. This mixer system should in particular allow the preparation of aqueous coating compositions which are suitable for refinishing, especially for repairing damaged areas on automobile bodies. The invention should ensure high color accuracy of the base colorants in order that the desired colors can be made up by the finisher as accurately and reproducibly as possible without costly measures. This also means that the base colorants used for the creation of this mixer system must possess a very long shelf life (>12 months).

Finally, the aqueous coating compositions prepared using this mixer system should produce coatings with good mechanical properties both in the case of special effect paints and solid-color paints.

This mixer system should at the same time guarantee the formulation of coating compositions which safeguard this high quality level and contain a lower proportion of organic solvents compared with that of conventionally prepared coating compositions.

Surprisingly, this object is achieved by a mixer system for the preparation of water-thinnable coating compositions with accurately defined colors, produced from various base colorants, which is characterized in that the mixer system comprises A) various base colorants A which contain less than 5% by weight of water, at least one colored and/or special effect pigment, an organic solvent, at least one water-thinnable or water-dispersible binder, except for polymers which have either polyether or polyether and polyester bonds and an acid value of below 15 mg of KOH/g and a hydroxyl value of between 100 and 1000 mg of KOH/g, and, optionally, auxiliary substances and additives, and B) at least one water-containing, pigment-free component B which may be additionally contain at least one rheology-controlling additive, further auxiliary substances and additives, one or more water-thinnable or water-dispersible binders, except for polymers which have either polyether or polyether and polyester bonds and an acid value of below 15 mg of KOH/g and a hydroxyl value of between 100 and 1000 mg of KOH/g, and, optionally, organic solvents.

The present invention also relates to a process for the preparation of water-thinnable coating compositions with accurately defined colors in which various base colorants of a mixer system are prepared and stored separately and only mixed shortly before the application of the coating composition, characterized in that the mixer system according to the invention is used.

The present invention finally also relates to the use of the mixer systems for the preparation of aqueous coating compositions for refinishing, especially for the preparation of waterborne paints for refinishing, in particular of automotive bodies. It is surprising and could not have been foreseen that the mixer system according to the invention allows the preparation of aqueous coating compositions which are distinguished by an accurate and reproducible setting of the desired color without the need for any costly measures. This is guaranteed by a high color accuracy and an appropriately long shelf life of the base colorants. A further advantage is that the base colorants prepared according to the invention are not susceptible to freezing and thawing. Furthermore, the aqueous coating compositions prepared in this manner have the advantage of furnishing coatings with good mechanical properties.

It is further advantageous that the mixer system according to the invention also makes available to the refinishing sector coating compositions which meet the stringent demands on the quality of refinishing and additionally contain as solvent predominantly water and only small amounts of organic solvents. In addition to economic advantages, this reduced proportion of solvent provides improved work safety (fire protection) and reduced environmental stress due to drying of paint films. This is especially important for the refinishing of automobile bodies, since the special effect paints used in this sector normally contain a very high proportion (up to 90%) of solvent in order to secure a good metallic effect.

The use according to the invention of essentially anhydrous and preferably completely anhydrous base colorants offers furthermore the advantage that it is possible, for the storage of these base colorants, to use containers which do not have to be protected against water corrosion (for example by an appropriate interior coating). In addition, it is also possible to use under certain assumptions water-sensitive pigments for the formulation of the base colorants, which greatly widens the choice of available pigments.

The individual components of the mixer system according to the invention are elucidated in greater detail in the text below.

The component A of the mixer system can contain any conventional paint pigment, provided that it does not react with water within a short time (time between mixing together components A and B and application of the paints) and does not dissolve in water. Component A can contain inorganic or organic special effect pigments and/or colored pigments. To ensure a spectrum of application as universal as possible and to achieve as many colors as possible it is preferred to create a mixer system based on components A containing only colored pigments and on components A containing only special effect pigments.

For the preparation of component A any special effect pigment normally employed in the formulation of aqueous coating compositions can be used. Examples of suitable special effect pigments are commercial aluminum bronzes, aluminum bronzes chromatized according to German Offenlegungsschrift 3,636,183, commercial stainless steel bronzes and other conventional metal platelets and metallic floccular pigments. Non-metallic special effect pigments, for example nacreous luster pigments or interference pigments, are also suitable for the preparation of component A. Examples of suitable inorganic colored pigments are titanium dioxide, iron oxides, carbon black and others. Examples of suitable organic colored pigments are Indanthrene Blue, Cromophthal Red, Irgazine Orange, Sicotrans Yellow, Heliogen Green and the like.

Any water-thinnable or water-dispersible binder which is normally used in aqueous coating compositions and can be prepared in the form of organic solutions, is suitable as binder for use in component A. Water-thinnability or water-dispersibility of the resins can also be promoted by the use of appropriate solubilizers as cosolvent or solvent. Decisive factors for the choice of the binders are on the one hand a long shelf life in organic solution, especially also an ability to inhibit the settling out of the pigments, and on the other hand an ability readily to incorporate the base colorant in component B or incorporate component B in the base colorant. It is true that the ability to incorporate the base colorant in component B and vice versa can also be controlled by the use of dispersants, such as ionic and non-ionic surfactants. However, such additives should be used in as small amounts as possible in order not to impair the water resistance of the resultant coatings.

Exceptions are the binders described in EP-A-368,499, i.e. polymers which have either polyether or polyether and polyester bonds and an acid value of below 15 mg of KOH/g and a hydroxyl value of between 100 and 1000 mg of KOH/g.

Water-thinnable or water-dispersible polyurethane resins, polyacrylate resins, polyester resins and amino resins and their mixtures, each being preparable in organic solution, are used in particular as binders for component A.

The polyurethane resins used as binders in the base colorants are in principle known. For example, the polyurethane resins described in the literature for use in waterborne paints are suitable, provided that these polyurethane resins—in modification of the preparation described in the particular literature—can be prepared in the form of organic solutions.

Examples of suitable polyurethane resins are the resins described in the following publications: EP-A-355,433 and German Offenlegungsschriften 3,545,618 and 3,813,866 as well as the as yet unpublished German Patent Application DE 4005961.8. Accordingly, for more details of the preparation of the polyurethane resins and examples of suitable compounds reference should be made to these documents. In contrast to the polyurethane resins described in these documents, the polyurethane resins are of course used not as an aqueous dispersion, but dissolved in one or more organic solvents. This means that the method of preparing the polyurethane resins used according to the invention has been modified compared with the methods described in these documents in that, instead of the preparation of a secondary dispersion, the polyurethane resins are dissolved in organic solvents. Water-thinnable polyurethane resins used for preference are those which have a number average molecular weight (as determined by gel permeation chromatography using polystyrene as standard) of 1000 to 30000, preferably of 1500 to 20000, and an acid value of 5 to 70 mg of KOH/g, preferably of 10 to 30 mg of KOH/g, and can be prepared by a reaction, preferably chain extension, of prepolymers containing isocyanate groups.

The preparation of the prepolymers containing isocyanate groups can be effected by a reaction of polyols having a hydroxyl value of 10 to 1800, preferably of 50 to 1200 mg of KOH/g, with excess polyisocyanates at temperatures of up to 150° C., preferably of 50 to 130° C., in organic solvents which cannot react with isocyanates. The equivalents ratio of NCO to OH groups is between 2.0:1.0 and >1.0:1.0, preferably between 1.4:1 and 1.1:1.

The polyols used for the preparation of the prepolymer can have a low molecular weight and/or a high molecular weight and they can contain inert anionic groups. Polyols of low molecular weight can be used in order to increase the hardness of the polyurethane. They have a molecular weight of 60 to about 400 and can contain aliphatic, alicyclic or aromatic groups. Amounts of up to 30% by weight of the total polyol components, preferably about 2 to 20% by weight, are used. In order to obtain an NCO prepolymer of high flexibility, a high proportion of a predominantly linear polyol having a preferred hydroxyl value of 30 to 150 mg of KOH/g should be added. Up to 97% by weight of the total polyol can consist of saturated and unsaturated polyesters and/or polyethers having a molecular mass Mn of 400 to 5000. The selected polyether diols should not introduce a excessive amounts of ether groups, since otherwise the formed polymers swell in water. Polyester diols are prepared by esterification of organic dicarboxylic acids or their anhydrides with organic diols or are derived from a hydroxycarboxylic acid or a lactone. To prepare branched polyester polyols, polyols or polycarboxylic acids of a higher oxidation state can be used to a small extent.

Aliphatic, cycloaliphatic and/or aromatic polyisocyanates containing at least two isocyanate groups per molecule are employed as typical multifunctional isocyanates. The isomers or isomer mixtures of organic diisocyanates are preferred. On account of their good resistance to ultraviolet light, (cyclo)aliphatic diisocyanates furnish products with a low tendency to yellowing.

The polyisocyanate component used for the formation of the prepolymer can also contain a proportion of polyisocyanates of a higher oxidation state, provided that this does not cause any yellowing. Products which are formed by trimerization or oligomerization of diisocyanates or by a reaction of diisocyanates with polyfunctional compounds containing OH or NH groups have been found to be satisfactory as triisocyanates. The average functionality can be reduced, if desired, by the addition of monoisocyanates.

To prepare high-solid polyurethane resin solutions, diisocyanates of the general formula (I)

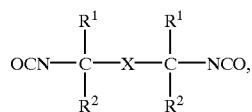

(I)

are used in particular, in which formula X stands for a divalent, aromatic hydrocarbon radical, preferably for a naphthylene, biphenylene or 1,2-, 1,3- or 1,4-phenylene radical substituted, if desired, by halogen, methyl or methoxy, particularly preferably for a 1,3-phenylene radical, and $R^1$ and $R^2$ stand for an alkyl radical having 1 to 4 carbon atoms, particularly preferably for a methyl radical.

Diisocyanates of the formula (I) are known (their preparation is described, for example, in EP-A-101,832 and in U.S. Pat. Nos. 3,290,350, 4,130,577 and 4,439,616) and are in part commercially available (1,3-bis(2-isocyanatoprop-2-yl)benzene, for example, is sold by the American Cyanamid Company under the brand name TMXDI (META)®).

Additionally to, or instead of, the diisocyanates of the formula (I), other aliphatic and/or cycloaliphatic and/or aromatic polyisocyanates can be employed. Examples of polyisocyanates which can be additionally used, are phenylene diisocyanate, toluylene diisocyanate, xylylene diisocyanate, bisphenylene diisocyanate, naphthylene diisocyanate, diphenylmethane diisocyanate, isophorone diisocyanate, cyclopentylene diisocyanate, cyclohexylene diisocyanate, methylcyclohexylene diisocyanate, dicyclohexylmethane diisocyanate, trimethylene diisocyanate, tetramethylene dusocyanate, pentamethylene disocyanate, hexamethylene diisocyanate, propylene diisocyanate, ethylethylene diisocyanate and trimethylhexane diisocyanate.

Polyurethanes are generally not compatible with water, unless special components are incorporated during their synthesis and/or special preparative steps are undertaken. Thus, it is possible to use for the preparation of the polyurethane resins compounds which contain two H-active groups reacting with isocyanate groups and at least one group which ensures water dispersibility (carrier groups). Suitable carrier groups are non-ionic groups. (for example polyethers), anionic groups, mixtures of these two groups or cationic groups.

In this manner it is possible to incorporate in the polyurethane resin an acid value which is sufficiently high for the neutralized product to be dispersible in water to form a stable dispersion. Compounds suitable to this end are those which contain two H-active groups reacting with isocyanate groups and at least one group capable of forming anions. Suitable groups reacting with isocyanate groups are in particular hydroxyl groups and primary and/or secondary amino groups. Groups capable of forming anions are carboxyl, sulfonic acid and/or phosphonic acid groups. Carboxylic acid or carboxylate groups are used for preference. They should be sufficiently slow to react, so that the isocyanate groups of the diisocyanate preferably react with the other groups of the molecule reactive with isocyanate groups. Alkanoic acids containing two substituents on a carbon atom in the a position are used for this purpose. The substituent can be a hydroxyl group, an alkyl group or an alkylol group. These polyols contain at least one, in general 1 to 3 carboxyl groups in the molecule. They contain two to about 25, preferably 3 to 10 carbon atoms. The carboxyl-containing polyol can represent 3 to 100% by weight, preferably 5 to 50% by weight, of the total polyol component in the NCO prepolymer. The amount of ionizable carboxyl groups available in salt form by the neutralization of the carboxyl groups is in general at least 0.4% by weight, preferably at least 0.7% by weight, based on the solids content. The upper limit is about 6% by weight. The amount of dihydroxyalkanoic acids in the non-neutralized prepolymer furnishes an acid value of at least 5, preferably of at least 10. With very low acid values other measures for achieving water dispersibility are in general necessary. The upper limit of the acid value is about 70, preferably about 40 mg of KOH/g, based on the solids content. The NCO prepolymers used according to the invention can be prepared by a simultaneous reaction of the polyol or polyol mixture with a diisocyanate excess. On the other hand, the reaction can also be carried out in stages in a prescribed order. Examples are described in German Offenlegungsschriften 2,624,442 and 3,210,051. The reaction temperature is not higher than 150° C., a temperature in the range of 50 to 130° C. being preferred. The reaction is continued until virtually all the hydroxyl functions have reacted. The NCO prepolymer contains at least about 0.5% by weight of isocyanate groups, preferably at least 1% by weight of NCO, based on the solids content. The upper limit is about 15% by weight, preferably 10% by weight, particularly preferably about 5% by weight.

The reaction can be performed, if desired, in the presence of a catalyst, such as organotin compounds and/or tertiary amines. In order to maintain the co-reactants in a liquid state and to allow better temperature control during the reaction, it is possible to add organic solvents contain no Zerewitinoff-active hydrogen atoms. The amount of solvent can vary within wide limits and should. be sufficient to form a prepolymer solution of suitable viscosity. In general, 10 to 70% by weight of solvent, preferably 20 to 50% by weight of solvent, based on the solids content, are used.

The isocyanate groups of the prepolymer which are still present, are reacted with a modifying agent. This reaction leads especially to a further union and increase of the molecular weight. The amount of this modifying agent is determined by its functionality and the NCO content of the prepolymer. The equivalents ratio of the active hydrogen atoms in the modifying agent to the NCO groups in the prepolymer should as a rule be less than 3:1 and should preferably be in the region between 1:1 and 2:1.

For the reaction with the prepolymer, compounds used as the modifying agents are preferably diols and particularly preferably triols and/or polyols.

However, other compounds containing active hydrogen atoms, for example polyamines, can also be employed as modifying agents, but only if the reaction of the prepolymer with the modifying agent can be carried out (controllably) in an organic solvent and if no undesirable reactions occur in this reaction, such as gelling at the entry point of the amine, frequently observed when polyamines are used. Examples of polyols containing at least three hydroxyl groups are trimethylolpropane, glycerol, erythritol, mesoerythritol, arabitol, adonitol etc. Trimethylolpropane is used for preference. The reaction of the prepolymer with the triols and/or polyols is preferably controlled by the stoichiometry of the compounds used in such a way that chain extension reactions occur.

The polyacrylate resins used as binders for component A are likewise known and described, for example, in German Offenlegungsschrift 3,832,826. Water-thinnable or water-dispersible polyacrylate resins which can be prepared in the form of organic solutions, are generally suitable. Water-thinnable or water-dispersible polyester resins, which can be prepared in the form of organic solutions, are also suitable as binders for component A. Examples of the polyester resins used are the appropriate commercially available water-thinnable or water-dispersible polyester resins and the polyester resins normally employed in waterborne paints. Exceptions are polymers which have either polyether or polyether and polyester bonds and an acid value of below 15 mg of KOG/g and a hydroxyl value of between 100 and 1000 mg of KOH/g.

Water-thinnable or water-dispersible amino resins are also suitable as binders for component A. Water-thinnable melamine resins are used for preference. They are in general etherified melamine-formaldehyde condensation products. The water solubility of the amino resins depends—apart from on the degree of condensation, which should be as low as possible—on the etherification component, only the lowest members of the alcohol or ethylene glycol monoether series producing water-soluble condensates. The most important melamine resins are those etherified with methanol. If solubilizers are used, even butanol-etherified melamine resins can be dispersed in the aqueous phase. It is also possible to add carboxyl groups to the condensate. Transetherification products of highly etherified formaldehyde condensates with hydroxy-carboxylic acids are water-soluble after neutralization via their carboxyl groups and can be incorporated in the base colorants.

Mixtures of the above binders or additionally or exclusively other water-thinnable or water-dispersible binders can of course also be used as binders in the base colorants A.

The base colorants A preferably contain as binders water-thinnable polyurethane resins or water-thinnable amino resins or mixtures of water-thinnable polyurethane resins and amino resins.

It an essential part of the invention that the base colorants A are essentially anhydrous and preferably completely anhydrous. The water content of the base colorants should be less than 5% by weight, based on the total weight of the base colorant.

The base colorant contains as solvents one or more organic solvents. Examples of suitable solvents are especially water-soluble or water-thinnable solvents, such as alcohols, esters, ketones, ketoesters, glycol ether esters and the like. Alcohols and glycol ethers are used preferably, butyl glycol and butanols particularly preferably.

It is possible in the preparation of the binders to use solvents which also later remain as solvents in the base colorant. However, more frequently another solvent is used for the preparation of the binders which is carefully removed after the preparation of the binders by vacuum distillation or by thin-layer evaporation, and is replaced by a solvent which remains in the binder solution which is subsequently used in the base colorant. Relatively high-boiling solvents should be water-soluble, and they remain in the polyurethane resin solution used in the base colorant in order to facilitate coalescence of the polymer particles during film formation.

Thus, for example, the preparation of the polyurethane resin solution is carried out in a ketone, such as methyl ethyl ketone or acetone. After butyl glycol has been added, the solvent exchange is then carried out by distillative removal of the ketone (methyl ethyl ketone, acetone). Solvents which are particularly preferred as solvents for the preparation of the polyurethane resin are methoxypropyl acetate, ethoxy-ethyl acetate and N-methylpyrroline which do not have to be exchanged (not active hydrogen) and can remain in component A. If desired, these solvents can also be used for the preparation of the polyurethane resins in a mixture with ketones, the ketones not remaining in the base colorant, however, but being exchanged after the preparation of the polyurethane resin.

Furthermore, component A can also contain conventional auxiliary substances and additives. Examples of such additives are antifoams, dispersants, emulsifiers, flow control agents and others.

The preparation of component A is carried out by methods known to a person skilled in the art by mixing and, if appropriate, dispersing the individual components. Thus, the incorporation of colored pigments is usually effected by grinding (dispersing) of the pigments in question with one or more of the binders described above, which are preferably used in the form of their solutions in organic solvents. If desired, further organic solvent can be added for the purpose of grinding. The grinding of these pigments is effected with the aid of conventional equipment, such as bead mills and sand mills.

The incorporation of the special effect pigments is normally carried out by homogeneous mixing of the special effect pigments with one or more solvents. This mixture is then stirred into a mixture of one or more of the binders described above, with or without the addition of further organic solvents, using a stirrer or a dissolver. The binders are preferably employed in the form of their solutions in organic solvents.

The particular proportions of pigments, binders and solvents are governed, as is known to a person skilled in the art, by the flow behavior of the pigment paste and are thus dependent on the particular pigment used.

A further component of the mixer system, essential to the invention, is the water-containing component B. The use of a component B which contains only deionized water and hence only serves for adjusting the processing viscosity or the processing solid of the base colorants, is conceivable. However, component B preferably contains at least one rheology-controlling additive. If desired, component B can also contain further auxiliary substances and additives, one or more water-thinnable or water-dispersible binders and organic solvents.

Crosslinked polymeric microparticles, such as those disclosed, for example, in EP-A-38,127, and/or other conventional rheological additives are used as the rheology-controlling additive. Thus, for example, inorganic stratified silicates, such as aluminum-magnesium silicates, sodium-magnesium stratified silicates and sodium-magnesium-fluorine-lithium stratified silicates of the montmorillonite type act as thickeners as do synthetic polymers containing ionic and/or associatively acting groups, such as polyvinyl alcohol, poly(meth)acrylamide, poly(meth)acrylic acid, polyvinylpyrrolidone, styrene-maleic anhydride copolymers or ethylene-maleic anhydride copolymers and their derivatives or also hydrophobically modified ethoxylated urethanes or polyacrylates. Inorganic stratified silicates are preferably used as thickeners. A combination of a carboxyl-containing polyacrylate copolymer having an acid value of 60 to 780, preferably 200 to 500 mg of KOH/g, and a sodium-magnesium stratified silicate is particularly preferred.

The sodium-magnesium stratified silicate is preferably employed in the form of an aqueous paste. Pastes which are particularly preferred, contain either 3% by weight of a stratified silicate and 3% by weight of polypropylene glycol or 2% by weight of a stratified silicate and 0.6% by weight of polypropylene glycol or 2% by weight of a stratified silicate and 2% by weight of other commercial surfactants, all percentages being based on the total weight of the paste. These aqueous pastes of the thickener should be added only to component B and not to component A.

The water-thinnable or water-dispersible polyurethane, polyacrylate, polyester and amino resins, already referred to in the description of component A, are suitable for use in component B, so that in this connection reference need only be made to pages 12 to 20 of the present description. In contrast to the use of these resins in component A, these binders, when used in component B, can be employed not only as an organic solution but preferably also in a water-containing form. This transfer of the resins to the aqueous phase is effected, for example, by neutralization of the carrier groups (groups capable of forming anions or cations, such as carboxyl groups) and subsequent dilution with water, with a preceding partial removal of the organic solvent used in the preparation of the resin, if appropriate, or by direct synthesis of the resin in the presence of water. For further details reference should be made to the literature in which the preparation of the resins is described (cf., for example, German Of fenlegungsschriften 3,210,051, 2,624, 442 and 3,739,332, U.S. Pat. No. 4,719,132, EP-A-89,497, U.S. Pat. Nos. 4,558,090 and 4,489,135, EP-A-38,127, German Offenlegungsschrift 3,628,124, EP-A-158,099, German. Offenlegungsschrift 2,926,584, EP-A-195,931 and German Offenlegungsschrift 3,321,180).

Furthermore, water-thinnable or water-dispersible polyurethane resins which cannot be prepared in the form of organic solutions, are also suitable as binders for component B. They are in particular polyurethane resins in which the prepolymer containing NCO groups has been reacted with a polyamine as modifying agent.

The preparation of these polyurethane resins is normally effected in such a manner that the NCO pre-polymer described on pages 12 to 18 of the present application are first rendered water-thinnable or water-dispersible. To this end the anionic groups of the NCO prepolymer, for example, are at least partially neutralized with a tertiary amine. The increased dispersibility in water brought about in this way is sufficient for infinite thinnability. It is also sufficient permanently to disperse the neutralized polyurethane. The isocyanate groups still present are reacted with the modifying agent. This reaction leads to a further union and an increase in the molecular weight. Water-soluble compounds are preferred as the modifying agent, because they increase the dispersibility of the polymeric end product in water. Organic diamines are also suitable, because they usually build up the highest molecular mass without causing the resin to gel. To this end it is assumed, however, that the prepolymer is dispersed in water prior to the chain extension or is present in another adequate dilution. The amount of the modifying agent is determined by its functionality and the NCO content of the prepolymer.

The presence of an excess of active hydrogen, especially in the form of primary amino groups, can give rise to polymers having an undesirably low molecular mass. The chain extension can be effected, at least partially, using a polyamine which has at least three amino groups containing a reactive hydrogen. This type of polyamine can be used in such an amount that after the extension of the polymer unreacted amine nitrogen atoms with 1 or 2 reactive hydrogen atoms are present. Such usable polyamines are diethylenetriamine, triethylenetetramine, dipropylenetriamine and dibutylenetriamine. Preferred polyamines are the alkyltriamines or cycloalkyltriamines, such as diethylenetriamine. In order to prevent any gelling taking place during the chain extension, small amounts of monoamines, such as ethylhexylamine, can also be added.

In addition, the water-thinnable emulsion polymers described in German Offenlegungsschrift 3,841,540 are also suitable as water-thinnable or water-dispersible binders for component B. These emulsion polymers can be obtained in that a) in a first stage 10 to 90 parts by weight of an ethylenically unsaturated monomer or a mixture of ethylenically unsaturated monomers are polymerized in aqueous phase in the presence of one or more emulsifiers and one or more radical-forming initiators, the ethylenically unsaturated monomer or the mixture of ethylenically unsaturated monomers being chosen so that in the first stage a polymer having a glass transition temperature ($T_{G1}$) of +30 to +110° C. is obtained and, b) after at least 80% by weight of the ethylenically unsaturated monomer or mixture of monomers used in the first stage have reacted, in a second stage 90 to 10 parts by weight of an ethylenically unsaturated monomer or a mixture of ethylenically unsaturated monomers are polymerized in the presence of the polymer obtained in the first stage, the monomer used in the second stage or the mixture of ethylenically unsaturated monomers used in the second stage being chosen so that a sole polymerization of the monomer used in the second stage or the mixture of ethylenically unsaturated monomers used in the second stage would give rise to a polymer having a glass transition temperature ($T_{G2}$) of −60 to +20° C., and the reaction conditions being chosen so that the resultant emulsion polymer has a number average molecular mass of 200000 to 2000000 and the type and amounts of the ethylenically unsaturated monomer or mixture of monomers used in the first stage and of the ethylenically unsaturated monomer or mixture of monomers used in the second stage being chosen so that the resultant emulsion polymer has a hydroxyl value of 2 to 100 mg of KOH/g, preferably of 10 to 50 mg of KOH/g, and the difference $T_{G1}-T_{G2}$ is 10 to 170° C., preferably 80 to 150° C.

The water-thinnable emulsion polymers used according to the invention can be prepared by a two-stage emulsion polymerization in an aqueous medium using known equipment and known processes.

The polymerization temperature is in general in the range of 20 to 100° C., preferably of 40 to 90° C. The proportions of monomers and water can be chosen so that the resultant dispersion has a solids content of 30 to 60% by weight, preferably 35 to 50% by weight.

In the first stage ethylenically unsaturated monomers or mixtures of ethylenically unsaturated monomers which are essentially free from hydroxyl and carboxyl groups, are used for preference. "Essentially free" is intended to signify that it is preferred to use monomers or mixtures of monomers which are free from hydroxyl and carboxyl groups, but that the monomers or mixtures of monomers used can also contain small amounts (for example due to impurities) of hydroxyl and/or carboxyl groups. The content of hydroxyl and carboxyl groups should preferably be at most such that a polymer prepared from the monomer or mixture of monomers used in the first stage has a hydroxyl value of not more than 5 mg of KOH/g and an acid value of not more than 3 mg of KOH/g.

The emulsion polymer used according to the invention should have a number average molecular mass (as determined by gel permeation chromatography using polystyrene as standard) of 200000 to 2000000, preferably of 300000 to 1500000 and normally acid values of less than 100 mg of KOH/g and hydroxyl values of 2 to 100 mg of KOH/g. If the emulsion polymer contains no acid groups or only very few acid groups (acid value approximately less than 3 mg of KOH/g), it is advantageous to add to the coating composition a carboxyl-containing resin, for example a carboxyl-containing polyurethane, polyester or polyacrylate resin.

The amounts of the carboxyl-containing resin should be chosen so that the acid value of the mixture of the emulsion polymer and the carboxyl-containing resin is greater than or equal to 10 mg of KOH/g.

A person skilled in the art knows how to choose the reaction conditions prevailing in the emulsion polymerization in order to obtain emulsion polymers possessing the above number average molecular masses (cf. for example Chemie, Physik and Technologie der Kunststoffe in Einzeldarstellungen, Dispersionen synthetischer Hochpolymerer, Part 1 by F. Hölscher, Springer Verlag, Berlin, Heidelberg, New York, 1969). The preparation of these water-thinnable emulsion polymers is described in detail on pages 2 to 5 of German Offenlegungsschrift 3,841,540, so that for greater detail only this German Offenlegungsschrift 3,841,540 need be referred to.

If desired, component B can also contain one or more organic solvents. and, if desired, further conventional auxiliary substances and additives. Examples of suitable organic solvents are the solvents already listed in the description of component A. The content of organic solvent is normally 0 to 3% by weight, based on the total weight of component B. Examples of suitable auxiliary substances and additives are likewise the additives listed in the description of component A. The amount of these additives used is normally 0 to 10% by weight, based on the total weight of component B.

Where component B contains binders, the binders used should preferably be water-thinnable or water-dispersible polyurethane re sins and/or amino resins or polyacrylate resins.

The mixer system according to the invention for the preparation of aqueous coating compositions with accurately defined colors consists of various pigmented base colorants (component A) and at least one water-containing component B. Depending on the desired color of the aqueous coating composition, to prepare the aqueous coating composition one or more base colorants of the mixer system are mixed with at least one water-containing component B directly prior to application of the aqueous coating composition. Typical mixer systems consist of 15 to 60, preferably 20 to 40, various base colorants and of 1 to 5, preferably 1 to 3, various components B.

As regards the description of the conventional mixing equipment for the stocking and storage of the base colorants and mixtures, reference is merely made to the published literature, such as the Glasurit Handbook, 11th edition, Kurt R., Vincentz Verlag, Hanover 1984, pages 544 to 547.

Preferred mixer systems according to the invention are obtained when base colorants are used as component A which contain Aa) 0.5 to 70% by weight of at least one special effect pigment and/or at least one colored pigment, Ab) 10 to 80% by weight of at least one water-thinnable or water-dispersible binder and, Ac) at least one organic solvent, the sum of the proportions by weight of the components Aa to Ac being in each case 100% by weight.

In addition, the base colorants can also contain 0 to 10% by weight, based on the total weight of component A, of conventional auxiliary substances and additives. The mixer system which consists of base colorants containing special effect pigments only and of base colorants containing colored pigments only, is particularly preferred.

Particularly preferred base colorants (component A), based on special effect pigments, contain Aa) 0.5 to 50% by weight of at least one special effect pigment, Ab) 20 to 80% by weight of at least one water-thinnable or water-dispersible binder and Ac) at least one organic solvent, the sum of the proportions by weight of the components Aa to Ac being in each case 100% by weight.

Particularly preferred base colorants (component A), based on inorganic colored pigments, contain Aa) 1 to 70% by weight of at least one inorganic colored pigment, Ab) 10 to 80% by weight of at least one water-thinnable or water-dispersible binder and Ac) at least one organic solvent, the sum of the proportions by weight of the components Aa to Ac being in each case 100% by weight.

Particularly preferred base colorants (component A), based on organic colored pigments, contain Aa) 1 to 30% by weight of at least one organic colored pigment, Ab) 10 to 80% by weight of at least one water-thinnable or water-dispersible binder and Ac) at least one organic solvent, the sum of the proportions by weight of the components Aa to Ac being in each case 100% by weight.

Base colorants which contain a combination of at least one organic colored and at least one inorganic colored pigment, can of course also be used as component A.

Mixtures preferably used as component B are those which contain

Ba) 60 to 100% by weight, preferably 80 to 97% by weight, of water,

Bb) 0 to 10% by weight, preferably 2 to 5% by weight, of at least one rheology-controlling additive, this amount being based on the weight of the pure additive without solvent, and BC) at least one water-thinnable or water-dispersible binder, if desired, the sum of the proportions by weight of the components Ba to Be being in each case 100% by weight.

To prepare the aqueous coating compositions, the various base colorants A are mixed in such a proportion that the desired color is obtained. The mixing proportion of component A with the sole component B or various components B is determined by the need for the resulting coating composition to have, independently of the color, the desired viscosity, the desired solids content and the desired content of organic solvents etc.

The solids content (the amount of solid binder used plus the amount of pigment used) and the content of organic solvent and the like vary with the application purpose of the aqueous coating compositions. In the automobile refinishing sector, the solids content for metallic finishes is preferably 7 to 25% by weight and for solid-color finishes preferably 10 to 45% by weight, in each case based on the total weight of the aqueous coating compositions.

A preferred embodiment of the mixer system according to the invention is a mixer system in which all the base colorants contain the same binder or in case of a binder mixture the same binders. It is particularly preferred that all base colorants of the mixer system contain the same ratio of the amount of solid binder used (i.e. without solvent) to the amount of organic solvent used. This ensures that—independently of the desired color and hence independently of the mixing ratio of the various base colorants—the resultant mixture of the various base colorants always has the same binder:solvent ratio and thus has approximately the same evaporation characteristics (drying) and a similar rheology, independent of color. Furthermore, this constant binder:solvent ratio in all base colorants ensures that the ratio binder (dissolved):binder (dispersed) in the finished aqueous paint is also constant, if appropriate, provided the component B contains binders.

The use of various base colorants each having an identical binder:solvent ratio has the practical advantage that, independently of the desired color in question, constant film properties are achieved.

If at any time a mixture of various binders is used in the base colorants, then the mixing ratio of the various binders with each other in the individual base colorants should preferably be in each case constant in order thus to achieve again after mixing with component B constant mixing ratios in respect of the binders, independently of color. If a mixture of the binders is used in component B which are also used in component A, then the mixing ratio of the various binders in component B with each other should preferably be the same as the mixing ratio of these binders in component A. Particularly preferred mixer systems are obtained when the-base colorant A contains as binder water-thinnable polyurethane resins and, optionally, an amino resin and the component B contains as binder polyurethane resin dispersions. The aqueous coating compositions prepared using the mixer system according to the invention can be applied to various substrates, such as metal, wood, plastics or paper. Should the aqueous coating compositions prepared using the mixer system according to the invention be applied to plastics, it is preferred that neither base colorants A nor component B contain any amino resin. In this case base colorants A which contain water-thinnable polyurethane resins as binder and no amino resin, are used in particular.

The aqueous coating compositions prepared using the mixer system according to the invention are also suited for automobile production line finishing. These aqueous coating compositions are particularly suited for refinishing of damaged areas, especially for automobile refinishing. In this case the coating compositions are applied directly after their preparation by mixing components A and B to the appropriately pretreated (for example by means of putties and fillers) area of damage using conventional methods, especially spraying. The aqueous coating compositions prepared using the mixer system according to the invention are preferably employed for producing a basecoat.

After the basecoat prepared in this manner has dried at room temperature or under forced drying conditions (for example 10 min. at 60° C., 80° C. or IR drying), a suitable transparent topcoat coating composition is applied. One- or two-component clearcoats, both in organic solvent solution and aqueous, as well as powder clearcoats are suitable as topcoat. Two-component clearcoats based on a hydroxyl-containing acrylate copolymer and a polyisocyanate are frequently used. Clearcoats of this type are described, for example, in Patent Applications DE 3,412,534, DE 3,609, 519, DE 3,731,652 and DE 3,823,005. Suitable one-component clearcoats, for example those based on a hydroxyl-containing binder and an amino resin curing agent, are also known and described, for example, in Kittel, Lehrbuch der Lacke und Beschichtungen, Volume IV; Verlag W. A. Colomb in der H. Heeremann GmbH, Berlin-Oberschwandorf 1976. Of course any other clearcoat not explicitly referred to here is suitable.

After an optionally required flash-off period of about 5 minutes, the basecoat is then dried together with the topcoat. If two-component clearcoats are used, drying is carried out in general at temperatures of below 100° C., preferably of below 80° C. The dry film thicknesses of the basecoat are in general between 5 and 25 µm, those of the topcoat in general between 30 and 70 µm.

If one-component clearcoats are used, the base-coat is dried together with the topcoat at elevated temperatures, for example at about 120° C. The dry film thicknesses of the topcoat are in this case generally between 30 and 50 µm.

The invention is elucidated in greater detail below by way of examples. All parts and percentages are by weight, unless expressly stated otherwise.

1. PREPARATION OF THE BINDERS FOR COMPONENTS A AND B

1.1. Preparation of a Polyurethane Resin 1 for Component A 686.3 g of a polyester having a number average molecular weight of 1400 and based on a commercial unsaturated dimeric fatty acid (having an iodine value of 10 mg of $I_2$/g, a monomer content of not more than 0.1%, a trimer content of not more than 2%, an acid value of 195 to 200 mg of KOH/g and a saponification value of 197 to 202 mg of KOH/g), isophthalic acid and hexanediol, are introduced in a protective gas atmosphere into a suitable reaction vessel fitted with a stirrer, reflux condenser and feed vessel, and 10.8 g of hexanediol, 55.9 g of dimethylolpropionic acid, 344.9 g of methyl ethyl ketone and 303.6 g of 4,4'-di (isocyanatocyclohexyl)methane are added in succession. This mixture is kept under reflux until the isocyanate content has dropped to 1.0%. 26.7 g of trimethylolpropane are then added to the mixture which is then kept under reflux until a viscosity of 12 dPas (at a solution of 1:1 =resin solution/N-methylpyrrolidone) is reached. 1378.7 g of butyl glycol are then added. After vacuum distillation in which the methyl ethyl ketone is removed, the resin solution is neutralized with 32.7 g of dimethylethanolamine. The solids content of the resultant resin solution is 44%.

The product obtained is diluted with vigorous stirring with butyl glycol to a solids content of 41% by weight.

1.2. Preparation of a Polyacrylate Resin 2 for Component B 280.03 g of deionized water and 2.50 g of a 30% aqueous solution of the ammonium salt of penta(ethylene glycol) nonyl phenyl ether sulfate (FenoponREP 110 from GAF Corp., emulsifier 1) are introduced into a cylindrical glass double-walled vessel fitted with a stirrer, reflux condenser, feed vessel provided with a stirrer, dropping funnel and thermometer and the mixture is heated to 80° C. In the feed vessel fitted with a stirrer, an emulsion is prepared from 5.00 g of emulsifier 1, 150.01 g of deionized water, 2.25 g of acrylamide, 107.92 g of methyl methacrylate, 60.84 g of n-butyl methacrylate and 42.71 g of styrene. 20% by weight of this emulsion are added to the mixture in the glass vessel. A solution of 0.18 g of ammonium peroxodisulfate (APS) in 11.04 g of deionized water is added dropwise over 5 minutes. An exothermic reaction sets in. The reaction temperature is kept between 80 and 85° C. 15 minutes before the addition of the above APS solution is concluded, a solution of 0.46 g of APS in 100.42 g of deionized water is added over 3 hours and the remaining 80% by weight of the above emulsion are added over one hour, the reaction temperature being kept at 80° C. When the addition of the emulsion has been concluded, the reaction mixture is cooled to 77° C. and treated over two hours with a mixture of 4.50 g of acrylamide, 8.96 g of methacrylic acid, 155.22 g of n-butyl acrylate, 24.79 g of methyl methacrylate, 22.50 g of hydroxypropyl methacrylate, 11.25 g of styrene, 8.96 g of 2-ethylhexyl acrylate and 0.46 g of eicosa(ethylene glycol) nonyl phenyl ether (Antarox$^R$CO 850 from GAF Corp., emulsifier 2). At the end of the addition the reaction mixture is kept at 80° C. for a further 1.5 hours. It is then cooled and the dispersion is passed through a fabric of 30 μm mesh size. A finely disperse dispersion is obtained which has a non-volatile content of 45% by weight, a pH of 3.8, a hydroxyl value of 19.4 mg of KOH/g and an acid value of 14.1 mg of KOH/g, based on solid resin.

1.3. Preparation of a Polyurethane Resin Dispersion 3 for Component B 686.3 g of a polyester having a number average molecular weight of 1400 and based on a commercial unsaturated dimeric fatty acid (having an iodine value of 10 mg of $I_2$/g, a monomer content of not more than 0.1%, a trimer content of not more than 2%, an acid value of 195 to 200 mg of KOH/g and a saponification value of 197 to 202 mg of KOH/g, isophthalic acid and hexanediol are introduced in a protective gas atmosphere into a suitable reaction vessel fitted with a stirrer, reflux condenser and feed vessel, and 10.8 g of hexanediol, 55.9 g of dimethylolpropionic acid, 344.9 g of methyl ethyl ketone and 303.6 g of 4,4'-di (isocyanatocyclohexyl)methane are added in succession. This mixture is kept under reflux until the isocyanate content has dropped to 1.0%. The mixture is then treated with 26.7 g of trimethylolpropane and kept under reflux until a viscosity of 12 dPas (at a solution of 1:1=resin solution/N-methylpyrrolidone) is reached. Any excess isocyanate which may be present, is decomposed by the addition of 47.7 g of butyl glycol. The reaction mixture is then treated with 32.7 g of dimethylethanolamine, 2688.3 g of deionized water and 193.0 g of butyl glycol with vigorous stirring. After the methyl ethyl ketone has been removed by vacuum distillation, a dispersion having a solids content of about 27% is obtained.

2. PREPARATION OF VARIOUS BASE COLORANTS A

The mixer system according to the invention is illustrated below by the preparation of various blue metallic paints as an example. To prepare other colors, differently pigmented base colorants A1-X to A4-X are of course required.

The preparation of the base colorants A1-X to A4-X is carried out for special effect pigments in the same manner as described below for A1-1 to A4-1 for an aluminum pigment, and for non-special effect pigments in the same manner as described below for A1-2 to A4-2 for a blue pigment, but in each case other suitable pigments are used, the ratios of the amounts of the binders to the solvents and, if appropriate, the ratios of the amounts of the binders to each other being in each case constant and corresponding to those in the procedures A1 to A4 described below. The degree of pigmentation is determined by the flow characteristics, as is known to a person skilled in the art.

2.1 Preparation of an Aluminum-containing Base Colorant A1-1

27 parts of an aluminum bronze chromatized according to German Offenlegungsschrift 3,636,183 (aluminum content 65%, average particle diameter 15 μm) are uniformly distributed in 27 parts of butyl glycol by stirring for 15 minutes and the suspension is then allowed to flow into a mixture of 10 parts of butyl glycol and 36 parts of a commercial, methyl-etherified melamine resin (75% solution in isobutanol) with stirring. This mixture is stirred for a further 30 minutes at 1000 rpm using a high-speed stirrer.

2.2 Preparation of an Aluminum-containing Base Colorant A2-1

15.5 parts of an aluminum bronze chromatized according to German Offenlegungsschrift 3,636,183 (aluminum content 65%, average particle diameter 15 μm) are uniformly distributed in 14 parts of butyl glycol by stirring for 15 minutes and the suspension is then allowed to flow into a mixture of 51 parts of the 41% neutralized solution of polyurethane resin 1, 19.5 parts of a commercial, methyl-etherified melamine resin (75% solution in isobutanol) and 10 parts of butyl glycol with stirring. This mixture is stirred for a further 30 minutes at 1000 rpm using a high-speed stirrer.

2.3 Preparation of an Aluminum-containing Base Colorant A3-1

20 parts of an aluminum bronze chromatized according to German Offenlegungsschrift 3,636,183 (aluminum content 65%, average particle diameter 15 μm) are uniformly distributed in 9 parts of butyl glycol and 7 parts of isobutanol by stirring for 15 minutes and the suspension is then allowed to flow into 64 parts of the 41% neutralized solution of polyurethane resin 1 with stirring. This mixture is stirred for a further 30 minutes at 1000 rpm using a high-speed stirrer.

2.4 Preparation of an Aluminum-containing Base Colorant A4-1

17.5 parts of an aluminum bronze chromatized according to German Offenlegungsschrift 3,636,183 (aluminum content 65%, average particle diameter 15 μm) are uniformly distributed in 16 parts of butyl glycol by stirring for 15 minutes and the suspension is then allowed to flow into a mixture of 56.5 parts of the 41% neutralized solution of polyurethane resin 1 and 10 parts of a commercial, methyl-etherified melamine resin (75% solution in isobutanol) with stirring. This mixture is stirred for a further 30 minutes at 1000 rpm using a high-speed stirrer.

2.5 Preparation of an Aluminum-containing Base Colorant A5-1

A base colorant AS-1 is prepared in the same manner as the base colorant A3-1, except that the commercial aluminum pigment Alu Stapa PP Chromal X/80 from Eckart, Fürth is used as the aluminum pigment.

2.6 Preparation of an Aluminum-containing Base Colorant A6-1 (Comparison Analogously to EP-A-320,552)

In the same manner as the procedure of the example in EP-A-320,552, 36 parts of an aluminum bronze chromatized according to German Offenlegungsschrift 3,636,183 (aluminum content 65%, average particle diameter 15 μm) are uniformly distributed in 60 parts of butyl glycol and 4 parts of polypropylene glycol by stirring for 15 minutes at 1000 rpm.

2.7 Preparation of an Aluminum-containing Base Colorant A7-1 (Comparison Analogously to German Offenlegungsschrift 3,915,459)

36 parts of an aluminum bronze chromatized according to German Offenlegungsschrift 3,636,183 (aluminum content 65%, average particle diameter 15 μm) are uniformly distributed in 64 parts of butyl glycol by stirring for 15 minutes at 1000 rpm.

2.8 Preparation of an Aluminum-containing Base Colorant A8-1 (Comparison with Base Colorant A5-1)

In the same manner as the procedure of Example 1 of EP-A-297,576, 17 parts of a commercial aluminum bronze (Alu-Stapa PP Chromal X/80 from Eckart, Furth; aluminum content 80%, average particle diameter 15 μm) are uniformly distributed in 7.5 parts of butyl glycol and 5.5 parts of isobutanol by stirring for 15 minutes and the suspension is then allowed to flow into 54 parts of the 41% neutralized solution of polyurethane resin 1 and the mixture is diluted with 16 parts of deionized water. It is then stirred for a further 30 minutes at 1000 rpm using a high-speed stirrer.

2.9 Preparation of a Blue-pigmented Base Colorant A1-2

10 parts of Paliogen Blue, 45 parts of a commercial, methyl-etherified melamine resin (75% solution in isobutanol) and 45 parts of butyl glycol are mixed with stirring and dispersed using a sand mill.

2.10 Preparation of a Blue-pigmented Base Colorant A2-2

7 parts of Paliogen Blue, 57 parts of the 41% neutralized solution of polyurethane resin 1, 15 parts of butyl glycol and 21 parts of a commercial, methyl-etherified melamine resin (75% solution in isobutanol) are mixed with stirring and dispersed using a sand mill.

2.11 Preparation of a Blue-pigmented Base Colorant A3-2

8 parts of Paliogen Blue, 73.5 parts of the 41% neutralized solution of polyurethane resin 1, 10.5 parts of butyl glycol and 8 parts of isobutanol are mixed with stirring and dispersed using a sand mill.

2.12 Preparation of a Blue-pigmented Base Colorant A4-2

7.5 parts of Paliogen Blue, 64 parts of the 41% neutralized solution of polyurethane resin 1, 11.5 parts of a commercial, methyl-etherified melamine resin (75% solution in isobutanol) and 17 parts of butyl glycol are mixed with stirring and dispersed using a sand mill.

2.13 Preparation of a Blue-pigmented Base Colorant A5-2 (Comparison with Base Colorant A2-2)

5.8 parts of Paliogen Blue, 46.7 parts of the 41% neutralized solution of polyurethane resin 1, 17.8 parts of a commercial, methyl-etherified melamine resin (75% solution in isobutanol) and 29.7 parts of deionized water are mixed with stirring and dispersed using a sand mill.

3. PREPARATION OF THE PIGMENT-FREE COMPONENT B

3.1 Preparation of a Mixture B1, Containing at Least One Secondary Dispersion 43 parts of a pre-swollen aqueous paste, containing 3% by weight of an inorganic sodium-magnesium stratified silicate thickener and 3% by weight of polypropylene glycol having a number average molecular weight of 900, the percentages being based on the total weight of the paste, 9 parts of deionized water, 0.5% part of a commercial antifoam and 3.5 parts of a 3.5% solution of a commercial polyacrylate thickener in water are added to 44 parts of polyurethane resin dispersion 3 with stirring.

3.2 Preparation of a Mixture B2, Containing at Least one Secondary Dispersion 54 parts of a pre-swollen aqueous paste, containing 3% by weight of an inorganic sodium-magnesium stratified silicate thickener and 3% by weight of polypropylene glycol having a number average molecular weight of 900, the percentages being based on the total weight of the paste, 17.5 parts of deionized water, 0.3% part of a commercial antifoam, 0.3 part of a 3.5% solution of a commercial polyacrylate thickener in water and 0.9 part of butyl glycol are added to 27 parts of polyurethane resin dispersion 3 with stirring.

3.3 Preparation of a Mixture B3, Containing at Least One Secondary Dispersion 46.5 parts of a pre-swollen aqueous paste, containing 3% by weight of an inorganic sodium-magnesium stratified silicate thickener and 3% by weight of polypropylene glycol having a number average molecular weight of 900, the percentages being based on the total weight of the paste, 13 parts of deionized water, 0.3% part of a commercial antifoam, 0.7 part of a 35% solution of a commercial polyacrylate thickener in water and 0.5 part of butyl glycol are added to 39 parts of polyurethane resin dispersion 3 with stirring.

3.4 Preparation of a Mixture B4, Containing at Least One Secondary Dispersion 47.5 parts of a pre-swollen aqueous paste, containing 3% by weight of an inorganic sodium-magnesium stratified silicate thickener and 3% by weight of polypropylene glycol having a number average molecular weight of 900, the percentages being based on the total weight of the paste, 23.5 parts of deionized water, 1 part of butyl glycol and 1 part of a 3.5% solution of a commercial polyacrylate thickener in water are added to 24 parts of polyurethane resin dispersion 3 and 3 parts of a commercial, methyl-etherified melamine resin (75% solution in isobutanol) with stirring.

3.5 Preparation of a Mixture B5, Containing at Least One Primary Dispersion 16.5 parts of deionized water, 1.5 parts of butyl glycol, 0.5 part of a commercial antifoam, 5 parts of a 3.5% solution of a commercial polyacrylate thickener in water and 19 parts of the polyacrylate dispersion 2 are added with stirring to 57.5 parts of a pre-swollen aqueous paste, containing 3% by weight of an inorganic sodium-magnesium stratified silicate thickener and 3% by weight of polypropylene glycol having a number average molecular weight of 900, the percentages being based on the total weight of the paste.

3.6 Preparation of a Mixture B6, Binder-free 35.5 parts of deionized water, 1.5 parts of butyl glycol, 0.5 part of a commercial antifoam and 5 parts of a 3.5% solution of a commercial polyacrylate thickener in water are added with stirring to 57.5 parts of a pre-swollen aqueous paste, containing 3% by weight of an inorganic sodium-magnesium stratified silicate thickener and 3% by weight of polypropylene glycol having a number average molecular weight of 900, the percentages being based on the total weight of the paste.

EXAMPLES 1 to 30

The aqueous base coating compositions 1–30 were prepared from components A and components B (as described in Tables 1–7) by stirring the base colorant(s) A in question, after its (their) preparation, into the mixture B in question. The viscosity was then adjusted to an efflux time of 20 seconds from a DIN 4 cup (at 20° C.) by adding deionized water.

In a second series of experiments the individual components were combined in order to test the shelf life after a separate storage of the individual components for a period of 6 months at room temperature and 3 months at 40° C.

Directly adjoining their preparation, the aqueous base coating compositions were sprayed by well-known methods onto phosphated steel panels (Bonder 132) coated with a commercial electrodeposition finish and a conventional (i.e. solvent-borne) or water-borne filler, this coating was further coated, after a flash-off period of 30 minutes at room temperature (at a relative air humidity of 50% and a room temperature of 20° C.), with a commercial conventional two-component clearcoat based on a hydroxyl-containing acrylate copolymer and an isocyanate crosslinking agent and the panels were dried for 30 minutes at 60° C. The dry film thickness of the base coating composition is ≈15 μm, that of the clearcoat ≈50 μm.

TABLE 1

Composition (in parts) of the aqueous base coatings

| Example | 1 | 2 | 3 | 4 | 5 |
|---|---|---|---|---|---|
| A1-1 | 13.0 | 9.7 | 8.7 | 6.5 | 4.3 |
| A1-2 | — | 2.7 | 3.6 | 5.3 | 7.1 |
| B1 | 87.0 | 87.6 | 87.7 | 88.2 | 88.6 |
|  | 100.0 | 100.0 | 100.0 | 100.0 | 100.0 |

The amount of component B1 is determined from the requirement for the ratio of the amount of components B1 to the amount of the melamine resin obtained from components A1-1 plus A1-2 in the coating to be constant. The amount of B1, when other components A1-X are used, is determined similarly.

TABLE 2

Composition (in parts) of the aqueous base coatings 6 to 10

| Example | 6 | 7 | 8 | 9 | 10 |
|---|---|---|---|---|---|
| A2-1 | 26.0 | 19.5 | 17.3 | 13.0 | 8.7 |
| A2-2 | — | 6.0 | 8.0 | 12.0 | 16.1 |
| B2 | 74.0 | 74.5 | 74.7 | 75.0 | 75.2 |
|  | 100.0 | 100.0 | 100.0 | 100.0 | 100.0 |

The amount of component B2 is determined from the requirement for the ratio of the amount of component B2 to the amount of the melamine resin and/or polyurethane resin obtained from components A2-1 plus A2-2 in the coating to be constant. The amount of B2, when other components A2-X are used, is determined similarly.

TABLE 3

Composition (in parts) of the aqueous base coatings 11 to 15

| Example | 11 | 12 | 13 | 14 | 15 |
|---|---|---|---|---|---|
| A3-1 | 19.0 | 14.25 | 12.7 | 9.5 | 6.3 |
| A3-2 | — | 4.25 | 5.7 | 8.5 | 11.3 |
| B3 | 81.0 | 81.5 | 81.6 | 82.0 | 82.4 |
|  | 100.0 | 100.0 | 100.0 | 100.0 | 100.0 |

The amount of component B3 is determined from the requirement for the ratio of the amount of component B3 to the amount of the polyurethane resin obtained from components A3-1 plus A3-2 in the coating to be constant. The amount of B3, when other components A3-X are used, is determined similarly.

TABLE 4

Composition (in parts) of the aqueous base coatings 16 to 20

| Example | 16 | 17 | 18 | 19 | 20 |
|---|---|---|---|---|---|
| A4-1 | 23.0 | 18.0 | 16.0 | 12.0 | 8.0 |
| A4-2 | — | 5.0 | 7.0 | 11.0 | 15.0 |
| B4 | 77.0 | 77.0 | 77.0 | 77.0 | 77.0 |
|  | 100.0 | 100.0 | 100.0 | 100.0 | 100.0 |

The amount of component B4 is determined from the processability of the base coating composition. Since the ratios of the amounts of the solid resins polyurethane resin/melamine resin are constant in all components A4-X and B4, these ratios of the amounts are also constant in all mixtures. In contrast to the remaining Examples 1 to 15 and 21 to 30, a small color-dependent variation in the binder to solvent ratio is present in Examples 16 to 20.

TABLE 5

Composition (in parts) of the aqueous base coatings 21 to 25

| Example | 21 | 22 | 23 | 24 | 25 |
|---|---|---|---|---|---|
| A2-1 | 28.0 | 21.2 | 18.9 | 14.2 | 9.5 |
| A2-2 | — | 6.3 | 8.4 | 12.7 | 17.0 |
| B5 | 72.0 | 72.5 | 72.7 | 73.1 | 73.5 |
|  | 100.0 | 100.0 | 100.0 | 100.0 | 100.0 |

The amount of component B5 is determined from the requirement for the ratio of the amount of component B5 to the amount of the polyurethane resin and/or melamine resin obtained from components A2-1 plus A2-2 in the coating to be constant. The amount of B5, when other A2-X components are used, is determined similarly.

TABLE 6

Composition (in parts) of the aqueous base coatings 26 to 30

| Example | 26 | 27 | 28 | 29 | 30 |
|---|---|---|---|---|---|
| A5-1 | 19.0 | 14.25 | 12.7 | 9.5 | 6.3 |
| A3-2 | — | 4.25 | 5.7 | 8.5 | 11.3 |
| B3 | 81.0 | 81.5 | 81.6 | 82.0 | 82.4 |
|  | 100.0 | 100.0 | 100.0 | 100.0 | 100.0 |

The amount of component B3 is determined from the requirement for the ratio of the amount of component B3 to the amount of the polyurethane resin and/or melamine resin obtained from components A5-1 plus A3-2 in the coating to be constant.

COMPARISON EXAMPLES C1-5

The compositions C1-5 correspond to those of Examples 6–10 described in Table 2, but A5-2 was used instead of A2-2 as the pigmented component.

COMPARISON EXAMPLES C6-7

The compositions C6-7 correspond to that of Example 1 in Table 1. A6-1 and A7-1 were used instead of A1-1 as the aluminum-containing components.

COMPARISON EXAMPLE C8

The composition C8 corresponds to that of Example 26 in Table 6. A8-1 was used instead of A5-1 as the aluminum-containing component.

Test Results

The test results obtained immediately after the preparation of, in each case, identical formulations (for example composition 10/C5 or composition 1/C6 and C7 or composition 26/C8) showed no significant differences in color, effect and DOI or appearance (this is shown as an example for composition 10/C5 in Table 7. The measurement of the color loci of the base coatings was carried out using a triangular measuring instrument (MMK 111 from Zeiss) at 25, 45 and 70° geometry).

However, significant differences were observed after three months' storage of the individual components at 40° C.: In this case the properties of the base colorants according to the invention differed from those of the comparison examples. Furthermore, the properties of the coating compositions according to the invention prepared using these stored components differed from those of the coating compositions prepared for comparison.

In the testing of the components, these differences are shown, for example, for A2-2 and A5-2 in Table 8. While A2-2 shows no significant color locus variation compared with tests on compositions using fresh components after 3 months at 40° C., it is distinctly recognizable in A5-2.

No significant color shift appeared in base coating compositions (Example 10 in Table 7, composition 10) prepared with A2-2 after storage, while there were significant differences in comparison examples prepared with A5-2 (example in Table 7 C5). In this case the base colorant A5-2 for use in a mixer system is also unsuitable because of poor shelf life, while A2-2 and A1-2 are suitable.

The base colorants A6-1 and A7-1 formed after preparation or later after renewed stirring within 1 to 2 hours a copious deposit. For this reason these base colorants are unsuitable for use in a mixer machine.

The base colorant A8-1 (comparable to A5-1, but stored with deionized water) showed after 2-3 days at 30° C. vigorous hydrogen evolution (gassing). The use of this base colorant in a mixer machine is therefore excluded for reasons of safety.

Furthermore, the drying characteristics (evaporation characteristics) of the coating compositions of the comparison examples also altered after six months' storage. Thus, the coating compositions of the Comparison Examples C1 to C8 showed after storage a distinctly slower rate of drying than the freshly prepared coating compositions C1 to C8. In contrast, the coating compositions of Examples 1 to 30 showed the same drying characteristics before and after storage. The coating compositions of Examples 1 to 30 and of Comparison Examples C1 to C8 show, when fresh components are used, approximately the same rate of drying, while after six months' storage the coating compositions C1 to C8 dry at a considerably slower rate than the coating compositions 1 to 30.

TABLE 7

Color determination (D 10° values) using the example of the base coating composition of Example 10 and of Comparison Example 5 (both metallic blue) using fresh components and components which have been stored:

| Example | Angle | Tests using fresh components | | | 3 months/40° C. | | | Color variation after storage | | | | |
| --- | --- | --- | --- | --- | --- | --- | --- | --- | --- | --- | --- | --- |
| | | L | a | b | L | a | b | DL | Da | Db | DC | DH |
| 10 | 25° | 92.6 | −7.4 | −19.0 | 90.7 | −7.1 | −19.1 | −1.9 | 0.3 | −0.1 | 0.0 | 0.3 |
| | 45° | 55.1 | −3.6 | −15.0 | 53.8 | −3.3 | −14.8 | −1.3 | 0.3 | 0.2 | −0.2 | 0.3 |
| | 70° | 33.4 | −1.0 | −12.9 | 33.0 | −0.9 | −13.1 | −0.4 | 0.1 | −0.2 | 0.2 | 0.1 |
| C5 | 25° | 91.4 | −7.5 | −20.3 | 92.1 | −4.9 | −15.5 | 0.7 | 2.6 | 4.8 | −5.4 | 0.9 |
| | 45° | 54.0 | −3.6 | −15.8 | 55.1 | −2.0 | −12.8 | 1.1 | 1.6 | 3.0 | −3.3 | 1.0 |
| | 70° | 32.6 | −0.7 | −13.4 | 33.9 | −0.4 | −11.5 | 1.3 | 0.4 | 1.9 | −1.9 | 0.3 |

| | Angle | DL | Da | Db | DC | DH |
| --- | --- | --- | --- | --- | --- | --- |
| Color variation | 25° | −1.2 | −0.2 | −1.3 | 1.3 | 0.3 |
| using fresh components | 45° | −1.1 | 0.0 | −0.8 | 0.8 | 0.2 |
| B10/C5 | 70° | −0.8 | 0.2 | −0.5 | 0.5 | 0.2 |

TABLE 8

Color measurement using the Zeiss instrument DC 38-90 using the example of component
A2-2 and A5-2 using fresh components and after storage of the components

| | Tests using fresh components | | | 3 months/40° C. | | | Color variation after storage | | | | |
|---|---|---|---|---|---|---|---|---|---|---|---|
| | L | a | b | L | a | b | DL | Da | Db | DC | DH |
| A2-2 | 24.7 | 2.5 | −4.7 | 24.5 | 2.8 | −4.8 | −0.2 | 0.3 | −0.1 | 0.2 | 0.2 |
| A5-2 | 25.3 | 4.2 | −6.2 | 24.9 | 3.2 | −5.9 | −0.4 | −1.0 | 0.3 | −0.8 | −0.7 |

| | DL | Da | Db | DC | DH |
|---|---|---|---|---|---|
| Color variation between A2-2 and A5-2 using both fresh components | 0.7 | 1.7 | −1.5 | 2.2 | 0.7 |

EXAMPLE 31

A polyurethane resin solution is first prepared as follows:

1061.9 g of a polyester having an average molecular weight Mn of 1400, based on a commercial unsaturated dimeric fatty acid having an iodine value of 10 mg of $I_2/g$, a monomer content of not more than 0.1%, a trimer content of not more than 2%, an acid value of 195 to 200 mg of KOH/g and a saponification value of 197 to 202 mg of KOH/g (Pripol 1009, a commercial product from Unichema International), isophthalic acid and hexanediol are introduced in a protective gas atmosphere into a suitable reaction vessel fitted with a stirrer, reflux condenser and feed vessel and 14.3 g of neopentyl glycol, 86.6 g of dimethylolpropionic acid, 437.2 g of 1,3-bis(2-isocyanatoprop-2-yl)benzene (brand name TMXDI (METAR) from American Cynamid) and 351.2 g of methoxypropyl acetate are added in succession.

This mixture is kept at 130° C. until the isocyanate content has dropped to 1.07%. 41.8 g of trimethylolpropane are then added to the mixture which is kept at 130° C. until no more NCO groups are detectable or until a viscosity of 30 dPas (at a solution of 1:1=resin solution/N-methylpyrrolidone) is reached. 532.8 g of butyl glycol are then added and the mixture is kept at 130° C. for 30 min. 43.2 g of dimethylethanolamine are then added to the reaction mixture and the resin solution is cooled. The solids content of the resultant resin solution is 64%.

In addition, an aluminum-containing base colorant is prepared as follows.

17 parts of an aluminum bronze chromatized according to German Offenlegungsschrift 3,636,183 (aluminum content 65% in petroleum ether/solvent naphtha/butyl glycol, average particle diameter 15 μm) are stirred into a mixture of 72 parts of the 64% neutralized solution of polyurethane resin described above and 11 parts of sec.-butanol. The mixture is stirred for a further 30 minutes at 1000 rpm using a high-speed stirrer.

Furthermore, a binder-free mixture B is prepared as follows:

57.5 parts of deionized water and 3.5 parts of a 3% solution of a commerical polyurethane thickener dissolved in water are added to 39 parts of a pre-swollen aqueous paste containing 3% by weight of an inorganic sodium-magnesium stratified silicate thickener and 3% by weight of polypropylene glycol having a number average molecular weight of 900, the percentages being based on the total weight of the paste.

An aqueous base coating composition 31 was prepared in that 25 parts of the aluminum-containing base colorant A described above was stirred immediately after its preparation into 75 parts of the mixture B described above. The viscosity was then adjusted with deionized water to an efflux time of 20 seconds from the DIN 4 cup (at 20° C.).

In a second series of experiments the individual components were combined to test shelf life after a separate storage of the individual components for a period of 6 months at room temperature and 3 months at 40° C.

The application and curing of the base coating composition 31 and the testing of the resultant coating was carried out in the same manner as with Examples 1 to 30. The test results obtained correspond to those of Examples 1 to 30.

What is claimed is:

1. A method for preparing an automotive refinish coating, comprising steps of
   preparing a mixer system comprising a plurality of separately stored base colorant components (A) and a separately stored pigment-free component (B);
   preparing a refinish coating composition having an accurately defined color matching a finish on an automotive vehicle from the mixer system by combining portions of components (A) and (B);
   applying the refinish coating composition to a portion of the automotive vehicle substrate; and
   drying the applied coating,
   wherein each base colorant component (A) consists essentially of:
   (Aa) from 0.5 to 70% by weight of at least one pigment selected from the group consisting of special-effect pigments, color-imparting pigments, and combinations thereof;
   (Ab) from 10 to 80% by weight of at least one water-thinnable or water-dispersible resin selected from the group consisting of polyurethane resins, amino resins, polyacrylate resins, polyester resins, and combinations thereof;
   (Ac) at least one organic solvent, and
   (Ad) less than 5% water,
   and further wherein the pigment-free component (B) comprises water and at least one water-thinnable or water-dispersible resin selected from the group consisting of polyurethane resins, amino resins, polyacrylate resins, polyester resins, and combinations thereof.

2. A method according to claim 1, wherein the mixer system includes a base colorant component (A) containing from 1 to 70% of at least one inorganic color-imparting pigment.

3. A method according to claim 1, wherein the mixer system includes a base colorant component (A) containing from 1 to 30% of at least one organic color-imparting pigment.

4. A method according to claim 1, wherein the pigment-free component (B) consists essentially of:
(Ba) from 80 to 97% by weight of water,
(Bb) from 2 to 5% by weight of at least one rheology-controlling additive,
(Bc) at least one water-thinnable or water-dispersible resin selected from the group consisting of polyurethane resins, amino resins, polyacrylate resins, polyester resins, and combinations thereof, and
(Bd) optionally, further auxiliaries and additives.

5. A method according to claim 1, wherein at least one base colorant component (A) includes a special-effect pigment selected from the group consisting of aluminum bronzes, chromatized aluminum bronzes, stainless steel bronzes, metal platelets, metallic floccular pigments, nacreous luster pigments, interference pigments, and combinations thereof.

6. A method according to claim 1, wherein each base colorant component (A) is anhydrous or essentially anhydrous.

7. A method according to claim 4, wherein the rheology-controlling additive comprises a member selected from the group consisting of crosslinked polymeric microparticles, inorganic stratified silicates, aluminum-magnesium silicates, sodium-magnesium stratified silicates, sodium-magnesium-fluorine-lithium stratified silicates, and combinations thereof.

8. A method according to claim 1, wherein the mixer system includes from 15 to 60 base colorant components (A).

9. A method according to claim 8, wherein at least part of the base colorant components (A) contain either one or more special effect pigments or one or more color-imparting pigments that are not special effect pigments, but not both.

10. A method according to claim 1, wherein the same resin (Ab) is used in each base colorant component (A).

11. A method according to claim 1, wherein each base colorant component (A) has the same ratio of resin (Ab) to organic solvent (Ac).

12. A method of producing water-thinnable automotive refinish basecoats, comprising steps of:
preparing a mixer system comprising a plurality of separately stored base colorant components (A) and a separately stored pigment-free component (B), wherein each said base colorant component (A) comprises less than 5% by weight of water, at least one pigment selected from the group consisting of colored pigments, special effect pigments, and combinations thereof, an organic solvent, at least one water-thinnable or water-dispersible resin selected from the group consisting of polyurethane resins, amino resins, polyacrylate resins, polyester resins, and combinations thereof, wherein at least one base colorant component (A) comprises a pigment that is not stable toward water; and further wherein pigment-free component (B) comprises water and at least one water-thinnable or water-dispersible resin selected from the group consisting of polyurethane resins, amino resins, polyacrylate resins, polyester resins, and combinations thereof;
preparing a refinish basecoat composition having a color accurately matching an automotive finish to be refinished by combining portions of components (A) and (B) shortly before application of the refinish basecoat composition.

13. A method of repairing a damaged area of a finish on an automobile body, comprising steps of:
providing a mixer system comprising a plurality of separately stored base colorant components (A) and a separately stored pigment-free component (B), wherein each said base colorant component (A) comprises less than 5% by weight of water, at least one pigment selected from the group consisting of colored pigments, special effect pigments, and combinations thereof, an organic solvent, at least one water-thinnable or water-dispersible resin selected from the group consisting of polyurethane resins, amino resins, polyacrylate resins, polyester resins, and combinations thereof, wherein at least one base colorant component (A) comprises a pigment that is not stable toward water; and further wherein pigment-free component (B) comprises water and at least one water-thinnable or water-dispersible resin selected from the group consisting of polyurethane resins, amino resins, polyacrylate resins, polyester resins, and combinations thereof;
preparing a refinish basecoat composition having a color accurately matching the finish having the damaged area by combining portions of components (A) and (B) shortly before application of the refinish basecoat composition; and
applying the refinish basecoat composition to the damaged area on the automobile body.

14. A mixer system, comprising:
a plurality of separately stored base colorant components (A) consisting essentially of:
(Aa) from 0.5 to 70% by weight of at least one pigment selected from the group consisting of special-effect pigments, color-imparting pigments, and combinations thereof;
(Ab) from 10 to 80% by weight of at least one water-thinnable or water-dispersible resin selected from the group consisting of polyurethane resins, amino resins, polyacrylate resins, polyester resins, and combinations thereof;
(Ac) at least one organic solvent, and
(Ad) less than 5% water
and a separately stored pigment-free component (B) comprising water and at least one water-thinnable or water-dispersible resin selected from the group consisting of polyurethane resins, amino resins, polyacrylate resins, polyester resins, and combinations thereof.

15. A mixer system according to claim 14, including a base colorant component (A) containing from 1 to 70% of at least one inorganic color-imparting pigment.

16. A mixer system according to claim 14, including a base colorant component (A) containing from 1 to 30% of at least one organic color-imparting pigment.

17. A mixer system according to claim 14, wherein the pigment-free component (B) consists essentially of:
(Ba) from 80 to 97% by weight of water,
(Bb) from 2 to 5% by weight of at least one rheology-controlling additive,
(Bc) at least one water-thinnable or water-dispersible resin selected from the group consisting of polyurethane resins, amino resins, polyacrylate resins, polyester resins, and combinations thereof, and
(Bd) optionally, further auxiliaries and additives.

18. A mixer system according to claim 14, wherein at least one base colorant component (A) includes a special-effect pigment selected from the group consisting of aluminum bronzes, chromatized aluminum bronzes, stainless steel bronzes, metal platelets, metallic floccular pigments, nacreous luster pigments, interference pigments, and combinations thereof.

19. A mixer system according to claim 14, wherein each base colorant component (A) is anhydrous or essentially anhydrous.

20. A mixer system according to claim 17, wherein the rheology-controlling additive comprises a member selected from the group consisting of crosslinked polymeric microparticles, inorganic stratified silicates, aluminum-magnesium silicates, sodium-magnesium stratified silicates, sodium-magnesium-fluorine-lithium stratified silicates, and combinations thereof.

21. mixer system according to claim 14, wherein the mixer system includes from 15 to 60 base colorant components (A).

22. mixer system according to claim 21, wherein at least part of the base colorant components (A) contain either one or more special effect pigments or one or more color-imparting pigments that are not special effect pigments, but not both.

23. mixer system according to claim 14, wherein the same resin (Ab) is used in each base colorant component (A).

24. mixer system according to claim 14, wherein each base colorant component (A) has the same ratio of resin (Ab) to organic solvent (Ac).

* * * * *